United States Patent
Lin

(10) Patent No.: US 7,342,362 B2
(45) Date of Patent: Mar. 11, 2008

(54) FULL-BRIDGE SOFT SWITCHING INVERTER AND DRIVING METHOD THEREOF

(75) Inventor: Song-Yi Lin, Taipei (TW)

(73) Assignee: MSTAR Semiconductor, Inc., Hsinchu County (TW)

( * ) Notice: Subject to any disclaimer, the term of this patent is extended or adjusted under 35 U.S.C. 154(b) by 0 days.

(21) Appl. No.: 11/432,631

(22) Filed: May 12, 2006

(65) Prior Publication Data

US 2006/0262581 A1 Nov. 23, 2006

(51) Int. Cl.
*H05B 37/02* (2006.01)

(52) U.S. Cl. ............ 315/209 R; 315/307; 315/291

(58) Field of Classification Search ............ 315/209 R, 315/224–226, 276, 291, 307; 363/17, 40, 363/98, 132
See application file for complete search history.

(56) References Cited

U.S. PATENT DOCUMENTS

| | | | | |
|---|---|---|---|---|
| 5,615,093 | A | 3/1997 | Nalbant | 363/25 |
| 5,930,121 | A | 7/1999 | Henry | 363/16 |
| 6,130,509 | A * | 10/2000 | Kates et al. | 315/224 |
| 6,259,615 | B1 | 7/2001 | Lin | 363/98 |
| 6,316,881 | B1 | 11/2001 | Shannon et al. | 315/219 |
| 6,396,722 | B2 | 5/2002 | Lin | 363/98 |
| 6,804,129 | B2 | 10/2004 | Lin | 363/98 |
| 7,205,724 | B2 * | 4/2007 | Ahn et al. | 315/209 R |
| 7,236,384 | B2 * | 6/2007 | Price et al. | 363/132 |
| 2005/0180183 | A1 * | 8/2005 | Price et al. | 363/132 |
| 2006/0076900 | A1 * | 4/2006 | Chen et al. | 315/209 R |
| 2006/0175983 | A1 * | 8/2006 | Crouse et al. | 315/291 |
| 2007/0014130 | A1 * | 1/2007 | Chiou | 363/21.04 |
| 2007/0029945 | A1 * | 2/2007 | Yu et al. | 315/224 |

FOREIGN PATENT DOCUMENTS

| | | |
|---|---|---|
| TW | 354438 | 3/1999 |
| TW | 478740 | 3/2002 |

OTHER PUBLICATIONS

U.S. Appl. No. 10/132,016, filed Apr. 24, 2002, Rajnikant Patel.

* cited by examiner

*Primary Examiner*—Thuy V. Tran
(74) *Attorney, Agent, or Firm*—WPAT, PC; Justin I. King

(57) ABSTRACT

A full-bridge soft switching inverter and a driving method thereof, using zero-voltage switching and conducting a circular current in a circuit including two n-channel MOSFET's so as to drive at least one load such as a cold cathode fluorescent lamp (CCFL) and a signal output device and to achieve low switching loss with high efficiency. The full-bridge soft switching inverter comprises a full-bridge circuit configuration including a first p-channel MOSFET having a first gate, a first drain and a first source; a first n-channel MOSFET having a second gate, a second drain and a second source; a second p-channel MOSFET having a third gate, a third drain and a third source; and a second n-channel MOSFET having a fourth gate, a fourth drain and a fourth source. The first gate driving signal and the second gate driving signal are substantially in-phase, while the third gate driving signal and the fourth gate driving signal are substantially in-phase.

28 Claims, 4 Drawing Sheets

US 7,342,362 B2

FULL-BRIDGE SOFT SWITCHING INVERTER AND DRIVING METHOD THEREOF

BACKGROUND OF THE INVENTION

1. Field of the Invention

The present invention generally relates to a full-bridge soft switching inverter and a driving method thereof and, more particularly, to a full-bridge soft switching inverter and a driving method using zero-voltage switching and conducting a circular current in a circuit including two n-channel metal-oxide-semiconductor field-effect transistors (MOSFET's) so as to drive a load such as a cold cathode fluorescent lamp (CCFL) or a signal output device.

2. Description of the Prior Art

Soft switching has become a mainstream technique in the power control IC industry due to its capability in handling signals at high frequencies with low switching loss and high efficiency.

A conventional full-bridge soft switching inverter is as shown in FIG. 1. The full-bridge soft switching inverter generally comprises four n-channel MOSFET's $Q_{AN}$, $Q_{BN}$, $Q_{CN}$, $Q_{DN}$ and a transformer $T_X$. More particularly, the transistors $Q_{AN}$ and $Q_{CN}$ are coupled to an input voltage $V_{in}$, respectively, and the node $V_{AB}$ between the transistors $Q_{AN}$ and $Q_{BN}$ and the node $V_{CD}$ between the transistors $Q_{CN}$ and $Q_{DN}$ are coupled to the primary side of the transformer $T_X$ with its secondary side coupled to a load L. The load L is also coupled to the negative terminal of a first diode $D_1$ and the positive terminal of a second diode $D_2$. The positive terminal of the first diode $D_1$ is grounded and the negative terminal of the second diode $D_2$ is grounded through a feedback resistor $R_S$.

FIG. 2 is another conventional full-bridge soft switching inverter and driving signals thereof. The full-bridge soft switching inverter in FIG. 2 is almost the same as the one in FIG. 1 except that the transistors $Q_{AP}$ and $Q_{CP}$ are p-channel MOSFETs.

FIG. 2 also shows the gate driving signals for the transistors $Q_{AP}$, $Q_{BN}$, $Q_{CP}$, and $Q_{DN}$. In FIG. 2, the first gate driving signal Drive_A and the second gate driving signal Drive_B are substantially in-phase and their duty cycles are approximately 50%. In order to insure zero-voltage switching, the duty cycle of the second gate driving signal Drive_B is slightly smaller than that of the first gate driving signal Drive_A, so that a period of turn-on dead time is available between the first and the second gate driving signals. Moreover, the third gate driving signal Drive_C and the fourth gate driving signal Drive_D are substantially in-phase and their duty cycles are approximately 50%. In order to insure zero-voltage switching, the duty cycle of the fourth gate driving signal Drive_D is slightly smaller than that of the third gate driving signal Drive_C, so that a period of turn-on dead time is available between the third and the fourth gate driving signals.

The full-bridge soft switching inverter in FIG. 2 conducts circular currents in a circuit including the transistors $Q_{AP}$ and $Q_{CP}$ and a circuit including the transistors $Q_{BN}$ and $Q_{DN}$. A p-channel MOSFET is inferior to an n-channel MOSFET in turn-on characteristics such as carrier mobility, turn-on resistance and reaction time, which adversely affects switching efficiency and operation speed of a full-bridge soft switching inverter.

Therefore, there is need in providing a full-bridge soft switching inverter and a driving method thereof so as to drive at least a load such as cold cathode fluorescent lamp (CCFL) or a signal output device at high frequency with low switching loss and high efficiency.

SUMMARY OF THE INVENTION

It is a primary object of the present invention to provide a full-bridge soft switching inverter and a driving method thereof, using zero-voltage switching and conducting a circular current in a circuit including two n-channel MOSFET's so as to achieve low switching loss and high efficiency.

In order to achieve the foregoing object, the present invention provides a full-bridge soft switching inverter, comprising:

a full-bridge circuit configuration comprising:

a first p-channel MOSFET having a first gate, a first drain and a first source, wherein said first gate receives a first gate driving signal and said first source receives an input voltage;

a first n-channel MOSFET having a second gate, a second drain and a second source, wherein said second gate receives a second gate driving signal, said second drain is coupled to said first drain and said second source is grounded;

a second p-channel MOSFET having a third gate, a third drain and a third source, wherein said third gate receives a third gate driving signal and said third source receives said input voltage; and a second n-channel MOSFET having a fourth gate, a fourth drain and a fourth source, wherein said fourth gate receives a fourth gate driving signal, said fourth drain is coupled to said third drain and said fourth source is grounded;

wherein said first gate driving signal and said second gate driving signal are substantially in-phase and the duty cycle of said second gate driving signal is greater than 50% and slightly smaller than that of said first gate driving signal so as to insure zero-voltage switching;

wherein said third gate driving signal and said fourth gate driving signal are substantially in-phase and the duty cycle of said fourth gate driving signal is greater than 50% and slightly smaller than that of said third gate driving signal so as to insure zero-voltage switching.

The present invention further provides method for driving a full-bridge soft switching inverter, comprising steps of:

providing a first gate driving signal received by a first gate of a first p-channel MOSFET;

providing a second gate driving signal received by a second gate of a first n-channel MOSFET;

providing a third gate driving signal received by a third gate of a second p-channel MOSFET; and providing a fourth gate driving signal received by a fourth gate of a second n-channel MOSFET;

wherein said first gate driving signal and said second gate driving signal are substantially in-phase and the duty cycle of said second gate driving signal is greater than 50% and slightly smaller than that of said first gate driving signal so as to insure zero-voltage switching;

wherein said third gate driving signal and said fourth gate driving signal are substantially in-phase and the duty cycle of said fourth gate driving signal is greater than 50% and slightly smaller than that of said third gate driving signal so as to insure zero-voltage switching.

DETAILED DESCRIPTION OF THE INVENTION

Figure 1:
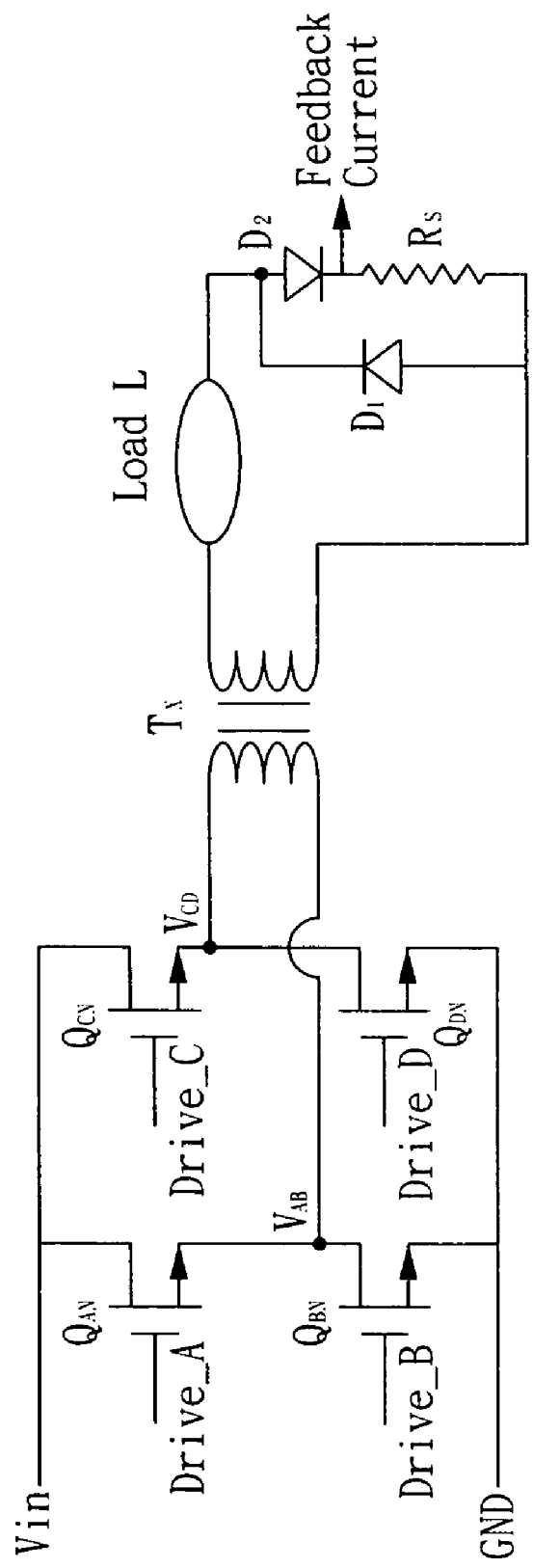
FIG. 1 is a conventional full-bridge soft switching inverter.
Figure 2:
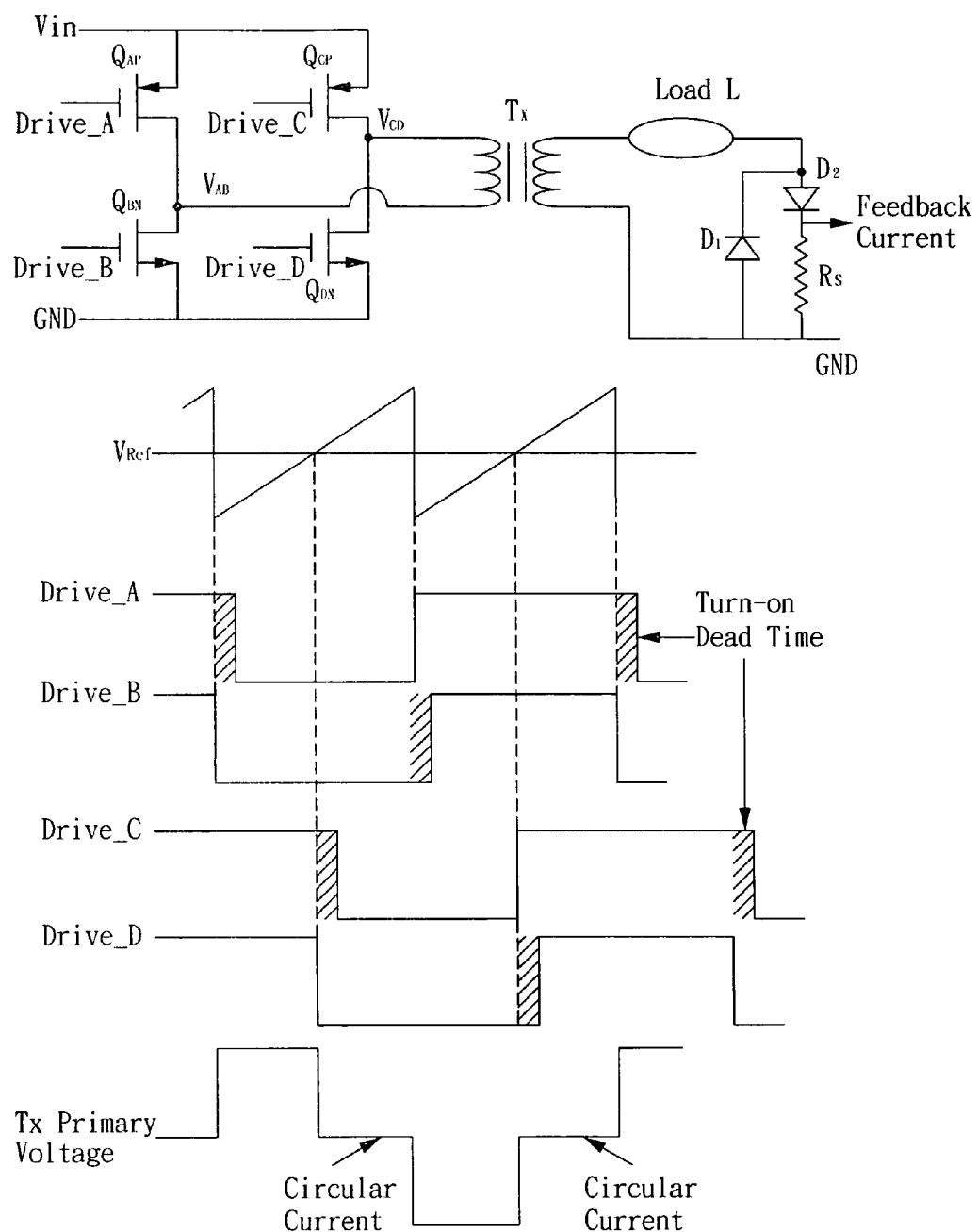
FIG. 2 shows a conventional full-bridge soft switching inverter and driving signals thereof.
Figure 3:
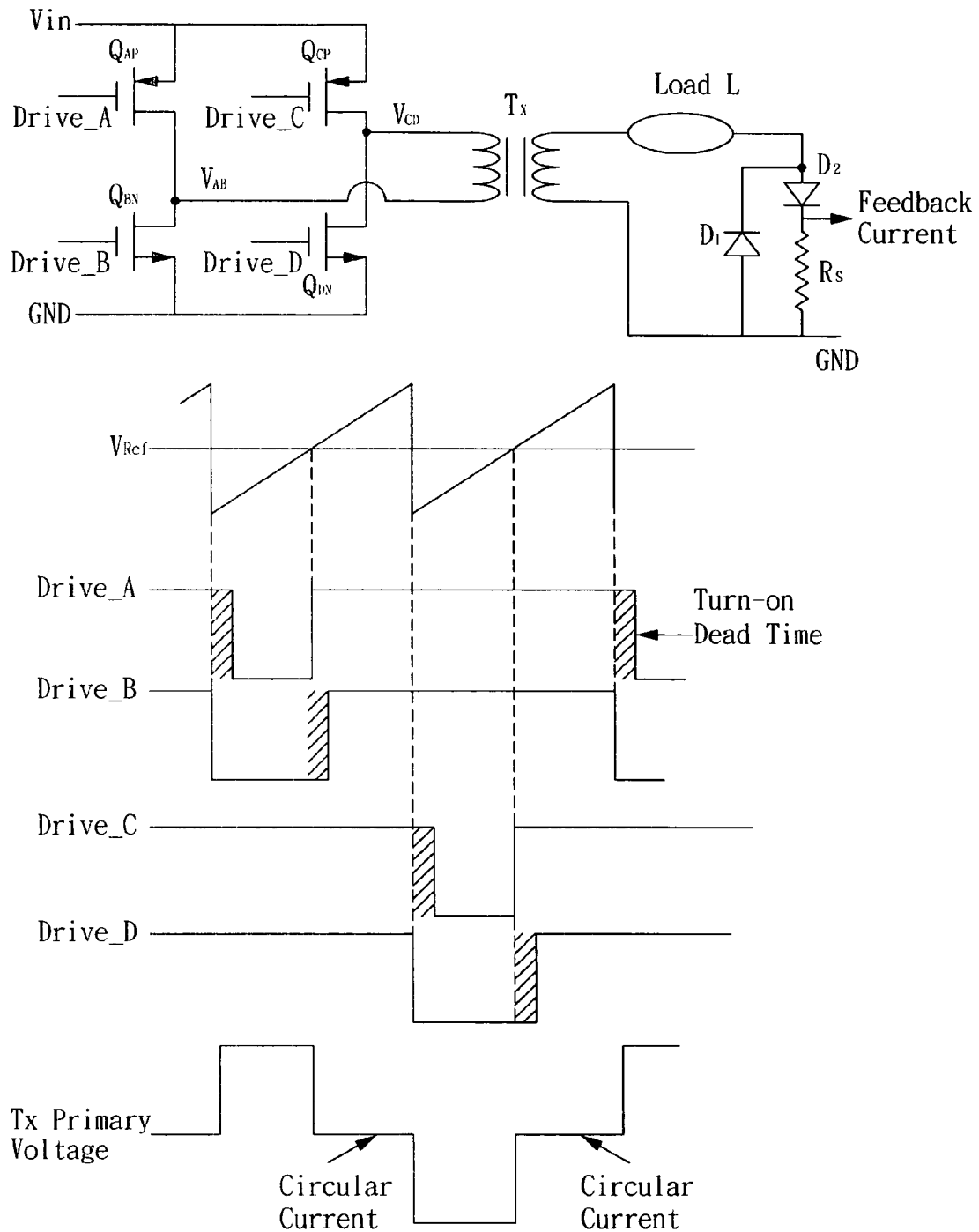
FIG. 3 shows a full-bridge soft switching inverter and driving signals thereof in accordance with one embodiment of the present invention.

The present invention providing a full-bridge soft switching inverter and a driving method thereof can be exemplified by the preferred embodiments as described hereinafter:

Please refer to FIG. 3, which is a full-bridge soft switching inverter and driving signals thereof in accordance with one embodiment of the present invention. The full-bridge soft switching inverter according to the present invention mainly comprises a full-bridge circuit configuration. The full-bridge circuit configuration comprises: a first p-channel MOSFET $Q_{AP}$ having a first gate, a first drain and a first source, wherein the first gate receives a first gate driving signal Drive_A and the first source receives an input voltage $V_{in}$; a first n-channel MOSFET $Q_{BN}$ having a second gate, a second drain and a second source, wherein the second gate receives a second gate driving signal Drive_B, the second drain is coupled to the first drain and the second source is grounded; a second p-channel MOSFET $Q_{CP}$ having a third gate, a third drain and a third source, wherein the third gate receives a third gate driving signal Drive_C and the third source receives the input voltage $V_{in}$; and a second n-channel MOSFET $Q_{DN}$ having a fourth gate, a fourth drain and a fourth source, wherein the fourth gate receives a fourth gate driving signal Drive_D, the fourth drain is coupled to the third drain and the fourth source is grounded.

In this embodiment, the full-bridge soft switching inverter of the present invention mainly comprises a transformer $T_X$. The transformer $T_X$ has a primary side and a secondary side. The primary side is coupled to a first node $V_{AB}$ between the first drain and the second drain and to a second node $V_{CD}$ between the third drain and the fourth drain, and the secondary side is coupled to at least one load L.

In this embodiment, the first gate driving signal Drive_A and the second gate driving signal Drive_B are substantially in-phase and the duty cycle of the second gate driving signal Drive_B is greater than 50% and slightly smaller than that of the first gate driving signal Drive_A so as to insure zero-voltage switching. Similarly, the third gate driving signal Drive_C and the fourth gate driving signal Drive_D are substantially in-phase and the duty cycle of the fourth gate driving signal Drive_D is greater than 50% and slightly smaller than that of the third gate driving signal Drive_C so as to insure zero-voltage switching.

When the first gate driving signal Drive_A and the second gate driving signal Drive_B are both low, the transistor $Q_{AP}$ is on and the transistor $Q_{BN}$ is off. When the first gate driving signal Drive_A and the second gate driving signal Drive_B are both high, the transistor $Q_{AP}$ is off and the transistor $Q_{BN}$ is on. Similarly, when the third gate driving signal Drive_C and the fourth gate driving signal Drive_D are both low, the transistor $Q_{CP}$ is on and the transistor $Q_{DN}$ is off. When the third gate driving signal Drive_C and the fourth gate driving signal Drive_D are both high, the transistor $Q_{CP}$ is off and the transistor $Q_{DN}$ is on. A zero-voltage circular current flowing in a circuit including the n-channel transistors $Q_{BN}$ and $Q_{DN}$ on the primary side of the transformer $T_X$. The arrangement of transistors $Q_{AP}$, $Q_{BN}$, $Q_{CP}$, $Q_{DN}$ helps to reduce the direct-current (DC) voltage level of the input voltage $V_{in}$. Preferable, the load L is coupled to a feedback resistor $R_S$ so as to output a feedback current.

Figure 4:
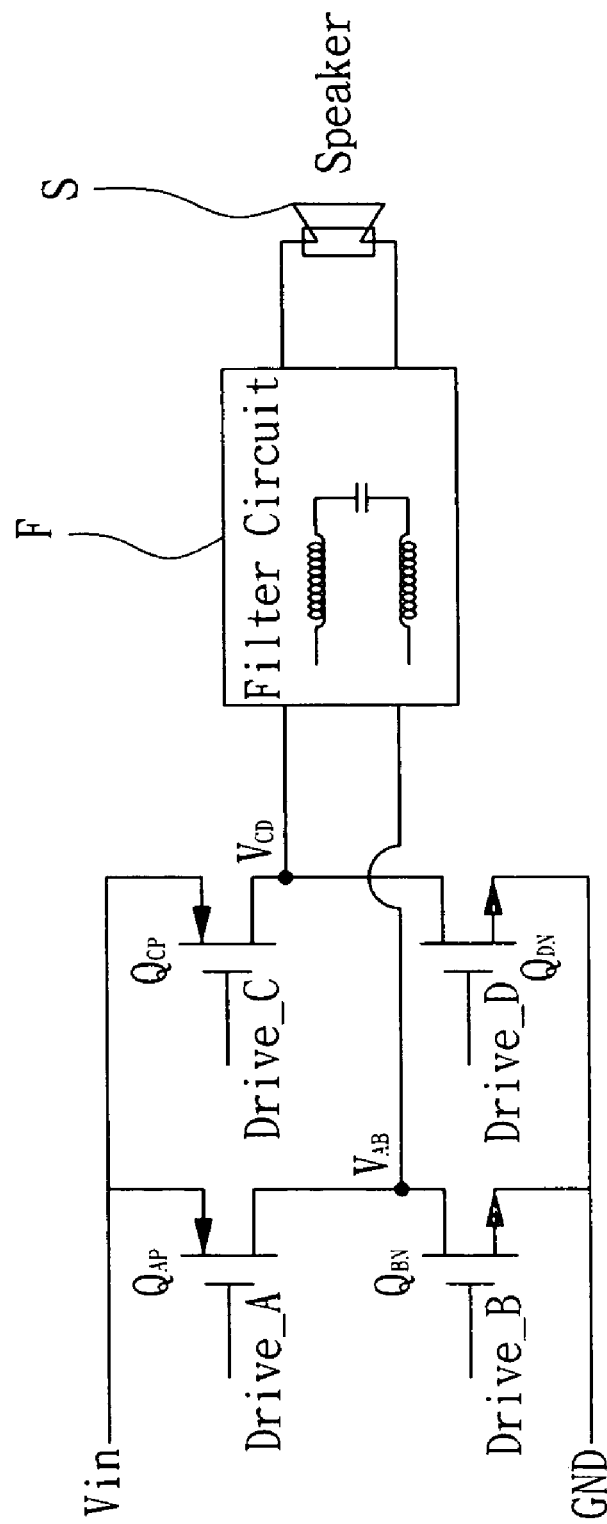
FIG. 4 shows a full-bridge soft switching inverter in accordance with another embodiment of the present invention.

FIG. 4 is a full-bridge soft switching inverter in accordance with another embodiment of the present invention. The full-bridge soft switching inverter of the present invention mainly comprises a full-bridge circuit configuration being coupled to a signal output device such as a speaker S through a filter circuit F.

In general, the full-bridge soft switching inverter and a driving method thereof in according to the present invention can be used to drive a cold cathode fluorescent lamp in a LCD backlight module or a signal output device such as a speaker. The present invention should not be limited to the aforementioned applications since many modifications can be made within the scope of the present invention by persons with ordinary skills in this art.

According to the present invention, the first gate driving signal Drive_A and the second gate driving signal Drive_B are substantially in-phase and the duty cycle of the second gate driving signal Drive_B is approximately 75% and slightly smaller than that of the first gate driving signal Drive_A so that a period of turn-on dead time is available between the first and the second gate driving signals to insure zero-voltage switching. Similarly, the third gate driving signal Drive_C and the fourth gate driving signal Drive_D are substantially in-phase and the duty cycle of the fourth gate driving signal Drive_D is approximately 75% and slightly smaller than that of the third gate driving signal Drive_C so that a period of turn-on dead time is available between the third and the fourth gate driving signals to insure zero-voltage switching. Preferably, the first gate driving signal Drive_A has a phase difference of half a cycle from the third gate driving signal Drive_C.

According to the above description, the present invention discloses a full-bridge soft switching inverter and a driving method using zero-voltage switching and conducting a circular current in a circuit including two n-channel MOSFET's. Since the electron mobility $\mu_n$ is as high as 1500 $cm^2/V\text{-sec}$ and the hole mobility $\mu_p$ is only 475 $cm^2/V\text{-sec}$ for Si at 300 k, the full-bridge soft switching inverter of the present invention provides reduced turn-on resistance and enhanced operation speed of the transistors. Therefore, the full-bridge soft switching inverter of the present invention can be used to drive a load such as a cold cathode fluorescent lamp and a signal output device with low switching loss and high efficiency.

Although this invention has been disclosed and illustrated with reference to particular embodiment, the principles involved are susceptible for use in numerous other embodiments that will be apparent to persons skilled in the art. This invention is, therefore, to be limited only as indicated by the scope of the appended claims.

What is claimed is:

1. A full-bridge soft switching inverter, comprising:
   a full-bridge circuit configuration comprising:
      a first p-channel MOSFET having a first gate, a first drain and a first source, wherein said first gate receives a first gate driving signal and said first source receives an input voltage;
      a first n-channel MOSFET having a second gate, a second drain and a second source, wherein said second gate receives a second gate driving signal, said second drain is coupled to said first drain and said second source is grounded;

a second p-channel MOSFET having a third gate, a third drain and a third source, wherein said third gate receives a third gate driving signal and said third source receives said input voltage; and a second n-channel MOSFET having a fourth gate, a fourth drain and a fourth source, wherein said fourth gate receives a fourth gate driving signal, said fourth drain is coupled to said third drain and said fourth source is grounded;

wherein said first gate driving signal and said second gate driving signal are substantially in-phase and the duty cycle of said second gate driving signal is greater than 50% and slightly smaller than that of said first gate driving signal so as to insure zero-voltage switching;

wherein said third gate driving signal and said fourth gate driving signal are substantially in-phase and the duty cycle of said fourth gate driving signal is greater than 50% and slightly smaller than that of said third gate driving signal so as to insure zero-voltage switching; and wherein a zero-voltage circular current conducts between the first n-channel MOSFET and the second n-channel MOSFET.

2. The full-bridge soft switching inverter as recited in claim 1, further comprising:

a transformer, having a primary side and a secondary side, said primary side being coupled to a first node between said first drain and said second drain and to a second node between said third drain and said fourth drain, and said secondary side being coupled to a load.

3. The full-bridge soft switching inverter as recited in claim 2, wherein said load is coupled to a feedback resistor so as to output a feedback current.

4. The full-bridge soft switching inverter as recited in claim 2, wherein said load is a cold cathode fluorescent lamp (CCFL).

5. The full-bridge soft switching inverter as recited in claim 1, further comprising:

a filter circuit, having an input side and an output side, said input side being coupled to a first node between said first drain and said second drain and to a second node between said third drain and said fourth drain, and said output side being coupled to a signal output device.

6. The full-bridge soft switching inverter as recited in claim 5, wherein said signal output device comprises a speaker.

7. The full-bridge soft switching inverter as recited in claim 1, wherein said first gate driving signal and said second gate driving signal are substantially in-phase and the duty cycle of said second gate driving signal is approximately 75% and slightly smaller than that of said first gate driving signal so as to insure zero-voltage switching.

8. The full-bridge soft switching inverter as recited in claim 1, wherein said third gate driving signal and said fourth gate driving signal are substantially in-phase and the duty cycle of said fourth gate driving signal is approximately 75% and slightly smaller than that of said third gate driving signal so as to insure zero-voltage switching.

9. The full-bridge soft switching inverter as recited in claim 1, wherein said first gate driving signal has a phase difference of half a cycle from said third gate driving signal.

10. A method for driving a full-bridge soft switching inverter, comprising steps of:

providing a first gate driving signal received by a first gate of a first p-channel MOSFET;

providing a second gate driving signal received by a second gate of a first n-channel MOSFET;

providing a third gate driving signal received by a third gate of a second p-channel MOSFET; and providing a fourth gate driving signal received by a fourth gate of a second n-channel MOSFET;

wherein said first gate driving signal and said second gate driving signal are substantially in-phase and the duty cycle of said second gate driving signal is greater than 50% and slightly smaller than that of said first gate driving signal so as to insure zero-voltage switching;

wherein said third gate driving signal and said fourth gate driving signal are substantially in-phase and the duty cycle of said fourth gate driving signal is greater than 50% and slightly smaller than that of said third gate driving signal so as to insure zero-voltage switching; and wherein a zero-voltage circular current conducts between the first n-channel MOSFET and the second n-channel MOSFET.

11. The method for driving a full-bridge soft switching inverter as recited in claim 10, further comprising a step of:

providing a transformer, having a primary side and a secondary side, said primary side being coupled to a first node between said first drain and said second drain and to a second node between said third drain and said fourth drain, and said secondary side being coupled to a load.

12. The method for driving a full-bridge soft switching inverter as recited in claim 11, wherein said load is coupled to a feedback resistor so as to output a feedback current.

13. The method for driving a full-bridge soft switching inverter as recited in claim 11, wherein said load is a cold cathode fluorescent lamp.

14. The method for driving a full-bridge soft switching inverter as recited in claim 10, further comprising a step of:

providing a filter circuit, having an input side and an output side, said input side being coupled to a first node between said first drain and said second drain and to a second node between said third drain and said fourth drain, and said output side being coupled to a signal output device.

15. The method for driving a full-bridge soft switching inverter as recited in claim 14, wherein said signal output device comprises a speaker.

16. The driving method of a full-bridge soft switching inverter as recited in claim 10, wherein said first gate driving signal and said second gate driving signal are substantially in-phase and the duty cycle of said second gate driving signal is approximately 75% and slightly smaller than that of said first gate driving signal so as to insure zero-voltage switching.

17. The method for driving a full-bridge soft switching inverter as recited in claim 10, wherein said third gate driving signal and said fourth gate driving signal are substantially in-phase and the duty cycle of said fourth gate driving signal is approximately 75% and slightly smaller than that of said third gate driving signal so as to insure zero-voltage switching.

18. The method for driving a full-bridge soft switching inverter as recited in claim 10, wherein said first gate driving signal has a phase difference of half a cycle from said third gate driving signal.

19. A full-bridge soft switching driving circuit for a cold cathode fluorescent lamp, comprising:
 a full-bridge circuit configuration comprising:
  a first p-channel MOSFET having a first gate, a first drain and a first source, wherein said first gate receives a first gate driving signal and said first source receives an input voltage;
  a first n-channel MOSFET having a second gate, a second drain and a second source, wherein said second gate receives a second gate driving signal, said second drain is coupled to said first drain and said second source is grounded;
  a second p-channel MOSFET having a third gate, a third drain and a third source, wherein said third gate receives a third gate driving signal and said third source receives said input voltage; and
  a second n-channel MOSFET having a fourth gate, a fourth drain and a fourth source, wherein said fourth gate receives a fourth gate driving signal, said fourth drain is coupled to said third drain and said fourth source is grounded; and
  a transformer, having a primary side and a secondary side, said primary side being coupled to a first node between said first drain and said second drain and to a second node between said third drain and said fourth drain, and said secondary side being coupled to said cold cathode fluorescent lamp;
  wherein said first gate driving signal and said second gate driving signal are substantially in-phase and the duty cycle of said second gate driving signal is greater than 50% and slightly smaller than that of said first gate driving signal so as to insure zero-voltage switching;
  wherein said third gate driving signal and said fourth gate driving signal are substantially in-phase and the duty cycle of said fourth gate driving signal is greater than 50% and slightly smaller than that of said third gate driving signal so as to insure zero-voltage switching; and
  wherein a zero-voltage circular current conducts between the first n-channel MOSFET and the second n-channel MOSFET.

20. The full-bridge soft switching driving circuit as recited in claim 19, wherein said cold cathode fluorescent lamp is coupled to a feedback resistor so as to output a feedback current.

21. The full-bridge soft switching driving circuit as recited in claim 19, wherein said first gate driving signal and said second gate driving signal are substantially in-phase and the duty cycle of said second gate driving signal is approximately 75% and slightly smaller than that of said first gate driving signal so as to insure zero-voltage switching.

22. The full-bridge soft switching driving circuit as recited in claim 19, wherein said third gate driving signal and said fourth gate driving signal are substantially in-phase and the duty cycle of said fourth gate driving signal is approximately 75% and slightly smaller than that of said third gate driving signal so as to insure zero-voltage switching.

23. The full-bridge soft switching driving circuit as recited in claim 19, wherein said first gate driving signal has a phase difference of half a cycle from said third gate driving signal.

24. A full-bridge soft switching driving circuit for a signal output device, comprising:
 a full-bridge circuit configuration comprising:
  a first p-channel MOSFET having a first gate, a first drain and a first source, wherein said first gate receives a first gate driving signal and said first source receives an input voltage;
  a first n-channel MOSFET having a second gate, a second drain and a second source, wherein said second gate receives a second gate driving signal, said second drain is coupled to said first drain and said second source is grounded;
  a second p-channel MOSFET having a third gate, a third drain and a third source, wherein said third gate receives a third gate driving signal and said third source receives said input voltage; and
  a second n-channel MOSFET having a fourth gate, a fourth drain and a fourth source, wherein said fourth gate receives a fourth gate driving signal, said fourth drain is coupled to said third drain and said fourth source is grounded; and
  a filter circuit, having an input side and an output side, said input side being coupled to a first node between said first drain and said second drain and to a second node between said third drain and said fourth drain, and said output side being coupled to said signal output device;
  wherein said first gate driving signal and said second gate driving signal are substantially in-phase and the duty cycle of said second gate driving signal is greater than 50% and slightly smaller than that of said first gate driving signal so as to insure zero-voltage switching; and
  wherein a zero-voltage circular current conducts between the first n-channel MOSFET and the second n-channel MOSFET.

25. The full-bridge soft switching driving circuit as recited in claim 24, wherein said signal output device comprises a speaker.

26. The full-bridge soft switching driving circuit as recited in claim 24, wherein said first gate driving signal and said second gate driving signal are substantially in-phase and the duty cycle of said second gate driving signal is approximately 75% and slightly smaller than that of said first gate driving signal so as to insure zero-voltage switching.

27. The full-bridge soft switching driving circuit as recited in claim 24, wherein said third gate driving signal and said fourth gate driving signal are substantially in-phase and the duty cycle of said fourth gate driving Signal is approximately 75% and slightly smaller than that of said third gate driving signal so as to insure zero-voltage switching.

28. The full-bridge soft switching driving circuit as recited in claim 24, wherein said first gate driving signal has a phase difference of half a cycle from said third gate driving signal.

* * * * *